United States Patent [19]

Landry et al.

[11] Patent Number: 5,517,624
[45] Date of Patent: May 14, 1996

[54] MULTIPLEXED COMMUNICATION PROTOCOL BETWEEN CENTRAL AND DISTRIBUTED PERIPHERALS IN MULTIPROCESSOR COMPUTER SYSTEMS

[75] Inventors: John A. Landry, Tomball; Dale J. Mayer, Houston; Paul R. Culley, Cypress, all of Tex.

[73] Assignee: Compaq Computer Corporation, Houston, Tex.

[21] Appl. No.: 955,482

[22] Filed: Oct. 2, 1992

[51] Int. Cl.⁶ .................................................... G06F 13/24
[52] U.S. Cl. ................................ 395/287; 364/DIG. 1; 364/230; 364/230.2; 364/231.5; 364/242.3; 364/242.6; 364/240; 395/856; 395/733
[58] Field of Search ........................... 395/325, 425, 395/725, 800, 275, 287, 856, 733, 477, 484; 370/85.7

[56] References Cited

U.S. PATENT DOCUMENTS

| | | | |
|---|---|---|---|
| 3,665,415 | 5/1972 | Beard et al. | 395/725 |
| 4,006,466 | 2/1977 | Patterson et al. | 395/275 |
| 4,218,739 | 8/1980 | Negi et al. | 395/735 |
| 4,261,034 | 4/1981 | Saccomano et al. | 395/275 |
| 4,271,468 | 6/1981 | Christensen et al. | 395/275 |
| 4,429,360 | 1/1984 | Hoffman et al. | 395/725 |
| 4,504,903 | 3/1985 | Dickman | 395/725 |
| 4,523,277 | 6/1985 | Schnathorst | 395/725 |
| 4,626,985 | 12/1986 | Briggs | 395/800 |
| 4,638,432 | 1/1987 | Niblock et al. | 395/725 |
| 4,648,029 | 3/1987 | Cooper et al. | 395/733 |
| 4,665,481 | 5/1987 | Stonier et al. | 395/425 |
| 4,719,565 | 1/1988 | Moller | 395/725 |
| 4,719,622 | 6/1988 | Whipple et al. | 395/325 |
| 4,750,168 | 6/1988 | Trevitt | 370/85.7 |
| 4,769,768 | 9/1988 | Bomba et al. | 395/725 |
| 4,870,704 | 9/1989 | Matelan et al. | 395/800 |
| 4,979,100 | 12/1990 | Makris et al. | 395/325 |
| 5,043,882 | 8/1991 | Ikeno | 395/725 |
| 5,072,365 | 12/1991 | Burgess et al. | 395/725 |
| 5,125,093 | 6/1992 | McFarland | 395/725 |
| 5,148,544 | 9/1992 | Cutler et al. | 395/725 |
| 5,161,228 | 11/1992 | Yasui et al. | 395/725 |
| 5,185,877 | 2/1993 | Bissett et al. | 395/425 |
| 5,218,703 | 6/1993 | Fleck et al. | 395/725 |

OTHER PUBLICATIONS

M. Polczynski, Multiple μP Control System Raises Throughout Without Bus Conflicts, Electronic Design, vol. 30, No. 1, Jan. 1982, pp. 281–285.
Intel Peripherals Databook, 1990, pp. 1–207 – 1–290.

*Primary Examiner*—Jack B. Harvey
*Assistant Examiner*—Ayaz R. Sheikh
*Attorney, Agent, or Firm*—Pravel, Hewitt, Kimball & Krieger

[57] ABSTRACT

A multiplexed communication protocol for broadcasting interrupt, DMA and other miscellaneous data across a bus from a central peripheral device to a plurality of distributed peripheral devices associated with each processor in a multiprocessor computer system. The multiplexed bus includes a data portion and a status portion, where the status portion indicates one of several different cycle types executed on the bus, and where each cycle type further indicates the data asserted on the data portion. The cycle types further include address and data read and write cycles to allow access of the registers in the distributed devices via the multiplexed bus. Thus, system interrupt, address, data, DMA, NMI and miscellaneous cycles are defined where a system interrupt cycle is continually executed on consecutive cycles until interrupted by a request to execute another cycle type. The cycle sequence is implemented to insert system interrupt cycles between the address and data cycles to prevent significant channel latency when system interrupts occur.

16 Claims, 6 Drawing Sheets

MUX BUS CONTROLLER STATE DIAGRAM

MULTIPLEXED COMMUNICATION PROTOCOL BETWEEN CENTRAL AND DISTRIBUTED PERIPHERALS IN MULTIPROCESSOR COMPUTER SYSTEMS

BACKGROUND OF THE INVENTION

1. Field of the Invention

The present invention relates to a multiplexed communication protocol for transmitting information between a central location and a plurality of similar distributed locations, and more particularly for transmitting interrupt, direct memory access (DMA) and other information between a central peripheral mounted on the system board of a multiprocessor computer system and a plurality of distributed peripherals associated with each microprocessor.

2. Description of the Related Art

The personal computer industry is evolving quickly due to the increasing demand for faster, smaller and more powerful computers. Modern computer systems are typically designed in modular form to achieve higher speed and power in as small a package as practical. In this manner, related functions are grouped together in single components and the components are connected together using several buses for transferring data between the components. As new capabilities are added or existing functions are enhanced or reorganized, the size and complexity of each of the components tends to increase. Consequently, the communication needs between the components becomes more complex and the number of input/output (I/O) signals increases, resulting in larger and more complicated bus structures.

The problems discussed above are prevalent in multiprocessor computer systems. Performance limits are being reached in single processor computer systems so that a major area of research in computer system architecture is multiprocessing. Multiprocessing involves a computer system which includes multiple processors that work in parallel on different problems or different parts of the same problem. The incorporation of several microprocessors significantly increases the complexity of a computer system. Consequently, the functions of the computer system are typically reorganized and new functions are added to solve contention problems between the processors. The addition and reorganization of functions creates the need for more sophisticated bus structures to provide efficient transfer of data.

For example, many functions that were centrally located in a single processor system may be distributed among the respective processors. Such distribution, however, often leads to a substantial increase in the number of I/O pins or signals between the central and distributed elements or components in a computer system. The width, or the number of signals residing on the respective buses, are significantly increased, resulting in larger and more expensive connectors when interfacing central and distributed functions. Also, the number of I/O pins on each device effects its size and packaging techniques. If gate arrays are used to implement the devices, larger die sizes and chips would be required to facilitate the increase in I/O pins.

It is desirable, therefore, to implement the necessary communication among central and distributed devices without significantly increasing the number of I/O pins or signals, and to allow smaller die sizes and chips and less number of signals residing on the buses.

SUMMARY OF THE PRESENT INVENTION

The multiplexed communication protocol of the present invention allows communication between a central peripheral and a plurality of distributed peripherals associated with each processor in a multiprocessor computer system without a significant number of I/O pins and signals.

The general structure of a personal multiprocessor computer system typically includes a host bus for interfacing one or more processors with main memory, an expansion bus such as the Extended Industry Standard Architecture (EISA) bus which is used to interface with one or more optional and external plug-in logic circuit boards, and also an X bus for interfacing with a plurality of peripheral devices such as a keyboard and a floppy disk controller. The processors typically must share the host bus for easy access to the main memory.

The SystemPro by Compaq Computer Corp., which is based on the i386 or i486 microprocessors by Intel, includes an EISA system peripheral (ESP) based on the 82357 integrated system peripheral (ISP) by Intel Corp., which incorporates many functions central to the computer system so that the ESP was conveniently located on the expansion bus. The ESP includes, however, a significant number of functions which could be considered local to each processor in a multiprocessor computer system.

The functions of the ESP are therefore divided into a central system peripheral or CSP, which essentially replaces the ESP, and a plurality of distributed system peripherals or DSPs, where each DSP is associated with one processor in a multiprocessor computer system. Each DSP is used as a support chip for the processor and its cache subsystem and is mounted onto a corresponding CPU board. Each DSP implements a local programmable interrupt controller, local timers, local direct memory access (DMA) logic, local nonmaskable interrupt (NMI) logic and miscellaneous processor and cache logic required to implement a symmetrical processor intended to be used in a symmetrical multiprocessor architecture.

The CSP combines in one chip the DMA controller, an EISA arbitration controller, a RAM refresh controller and numerous system board logic functions. The CSP receives RAM refresh requests and system interrupt signals, detects several NMI conditions on the system board and detects DMA terminal count and interrupt events and must communicate all of these conditions, among others, to the DSPs.

A multiplexed communication protocol according to the present invention, which is implemented on several bus lines collectively referred to as the multiplexed (MUX) bus, allows the CSP to broadcast a plurality of system interrupts, non-maskable interrupts and DMA information from the CSP to the DSPs. The MUX bus includes a data portion and a status portion which indicates one of several different cycle types executed on the MUX bus, where each type further indicates the data on the data portion. A clock signal provides synchronization, where each clock cycle or period preferably corresponds to a MUX bus cycle. The CSP preferably includes a MUX bus controller which multiplexes a plurality of cycles on the MUX bus, where each cycle preferably transfers up to eight signals on the data portion. Many of the system interrupts that must be communicated with a minimum of delay are transferred effectively continuously on generally consecutive MUX bus cycles. The remaining system interrupts, as well as DMA events, non-maskable interrupt events and other miscellaneous events are transferred on corresponding cycles which are executed by interleaving with the repeating interrupt cycle.

The DSPs also include a plurality of registers that system devices and other CPUs need to access. Thus, an address and respective data read and write cycles are performed on the MUX bus to access these registers. The data transfers preferably comprise three clock cycles to allow changing direction of the bi-directional data bus. The system interrupt cycles are executed after the address cycle and before the data cycles to prevent significant latency of system interrupts.

A MUX bus according to the present invention allows a significant reduction in the number of I/O pins required between the CPUs and the CSP. The reduction in the number of I/O pins allows smaller connectors and smaller die sizes on the chips used to implement the central processing units (CPUs) and CSP, which allows significant reduction in size and cost savings of a multiprocessor computer system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
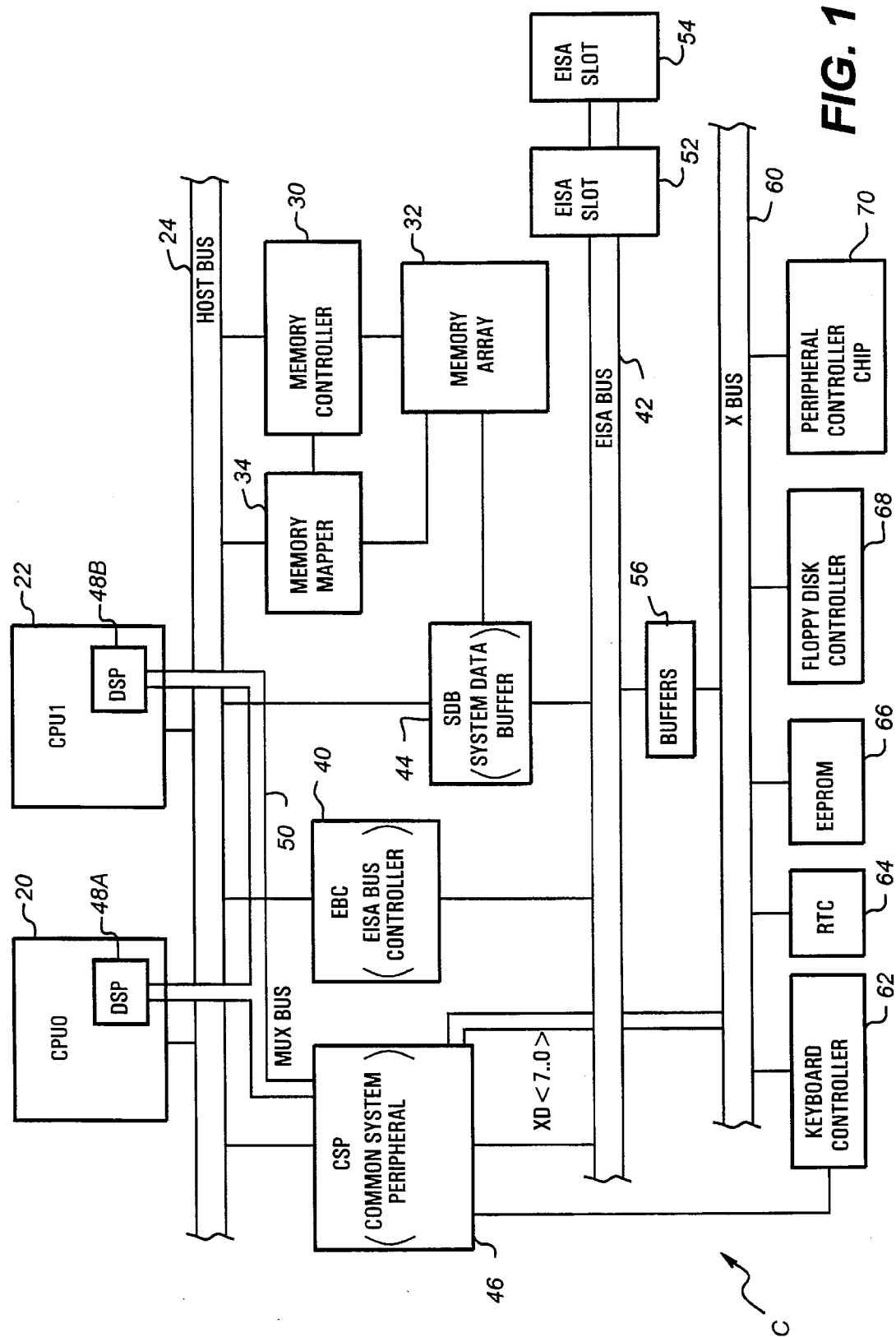
FIG. 1 is a block diagram of a computer system incorporating a multiplexed bus according to the present invention.

Referring now to FIG. 1, a computer system C is shown. The computer system C is a multiprocessor system with two processors in the preferred embodiment, although a computer system according to the present invention may include more processors or may be a single processor system. The elements of the computer system C that are not significant to the present invention, other than to illustrate an example of a fully configured computer system, are not discussed in detail.

The computer system C preferably includes two CPUs, referred to as CPU 20 and CPU 22, respectively, which are connected to a host bus 24. In the preferred embodiment, CPU 20 is logically assigned the position of CPU0, and CPU 22 is assigned logical CPU1, although these assignments are preferably programmable and may be changed. A memory controller 30 is coupled to the host bus 24 and also to a main memory array 32, where the memory array 32 preferably comprises dynamic random access memory (DRAM). Memory mapper logic 34 is coupled to the host bus 24, the memory controller 30 and the memory array 32, and provides memory mapping functions to facilitate memory accesses to the memory array 32.

The computer system C includes an expansion bus 42, where the expansion bus 42 is preferably the Extended Industry Standard Architecture (EISA) bus, although other types of expansion buses are contemplated. A corresponding EISA bus controller (EBC) 40 is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42 and the memory array 32. The SDB 44 functions to buffer and transfer data between the host bus 24 and the memory array 32, between the host bus 24 and the EISA bus 42 and between the EISA bus 42 and the memory array 32. A logic block referred to as the common system peripheral (CSP) 46 is coupled between the host bus 24 and the EISA bus 42. The CSP 46 is coupled to logic blocks referred to as the distributed system peripherals (DSPs) 48a and 48b in the CPUs 20 and 22, respectively, through a multiplexed (MUX) bus 50 which is implemented according to the present invention. The CSP 46 is also coupled to a keyboard controller 62 receiving a mouse interrupt signal MSEINT* and a keyboard interrupt signal KBINT*.

The EISA bus 42 includes a plurality of EISA slots 52 and 54 for receiving EISA expansion cards, such as network interface or hard disk interface cards for example. The EISA bus 42 is coupled through buffers 56 to a bus referred to as the X bus 60. A number of peripheral devices are coupled to the X bus 60, including the keyboard controller 62, a real time clock (RTC) 64, an electrically erasable programmable read only memory (EEPROM) 66, a floppy disk controller 68, and a peripheral controller chip 70 which includes numerous parallel ports and UARTS (universally asynchronous receiver/transmitters). The CSP 46 is coupled to an 8-bit data bus of the X bus 60 referred to as XD, where the XD data bus includes signals XD<15 . . . 0>. The XD data bus is the latched version of corresponding data bits residing on the EISA bus 42.

Figure 2:
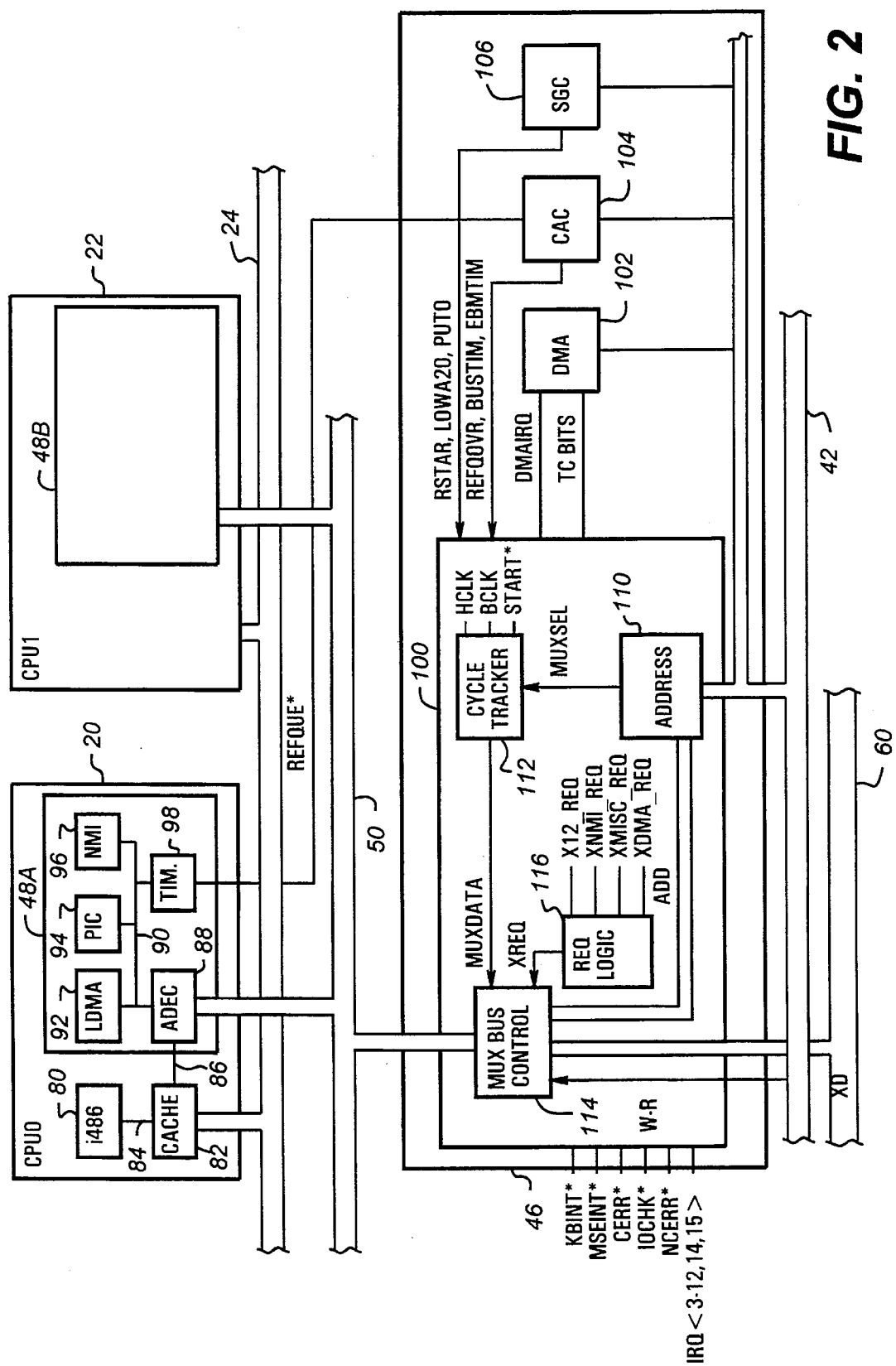
FIG. 2 is a more detailed block diagram showing relevant portions and connections of the DSP, the CSP and the multiplexed bus of FIG. 1.

Referring now to FIG. 2, a more detailed diagram is shown of the DSP 48a of the CPU 20 coupled to the CSP 46 through the MUX bus 50. Only the CPU 20 and its DSP 48a are described fully, it being understood that the CPU 22 and its DSP 48b operate in a very similar manner unless otherwise stated. The CPU 20 includes a processor 80 which is preferably the i486 processor by Intel, although other types of processors are contemplated for use with the present invention. The processor 80 is coupled to a local cache subsystem 82 within the CPU 20 through a processor bus 84. The cache subsystem 82 is coupled to the host bus 24 and also to input/output (I/O) interface logic (ADEC) 88 of the DSP 48a through a local I/O bus 86. The DSP 48a comprises many of the logic functions and registers that are closely coupled to the processor 80 and the cache subsystem 82, which were previously provided centrally through the ESP of the SystemPro architecture. These local functions include local direct memory access logic (LDMA) 92, a programmable interrupt controller (PIC) 94, non-maskable interrupt (NMI) logic 96, and a plurality of local timers 98.

The LDMA 92, the PIC 94, the NMI logic 96 and the timers 98 are coupled to the ADEC 88 through local select, data and control lines 90. The ADEC 88 is also coupled to the MUX bus 50 for interfacing with the CSP 46, and thus serves as a dual port I/O interface between the cache subsystem coupled to the local I/O bus 86 and the CSP 46 coupled to the MUX bus 50. The ADEC 88 includes latches and control logic to select and access the local registers associated with each of the local functions within the DSP 48a across the lines 90. In this manner, many of these local registers are accessible to the processor 80 and cache subsystem 82 and to the CSP 46 through the ADEC 88, the MUX bus 50 and the local I/O bus 86. The local I/O bus 86 allows the processor 80 to access its local registers without encountering the overhead of the EISA bus 42. The MUX bus 50 provides an interface for the CSP 46 to broadcast data to the DSPs 48a and 48b. The MUX bus 50 further allows the CPU 22 and other system devices to access the local registers of the CPU 20 located in the CSP 48a and also allows the CPU 20 to access the local registers of other CPUs, including the CPU 22. The cache subsystem 82 contains address decode and encode logic and determines whether a cycle initiated by the processor 80 is local to the CPU 20 so that the cycle should be performed on the local I/O bus 86. Otherwise, an access to the DSPs 48a and 48b is performed through the EISA bus 42, the CSP 46 and the MUX bus 50, which will be described more fully below.

The LDMA 92 includes local DMA status registers used for maintaining the current terminal count (TC) status of the DMA controller 102 for the CPU 20. The local DMA status registers preferably contain the TC bits that indicate which of the seven DMA channels have reached terminal count, where these TC bits are TC<0 . . . 3> and TC<5 . . . 7> corresponding to the seven channels of the DMA controller 102. The TC bits are updated via a MUX bus DMA cycle, which will be described below.

The CSP 46 includes a MUX bus interface 100 which is coupled to the MUX bus 50, the EISA bus 42, the XD data bus, the keyboard controller 62, the SDB 44 and various other system components. The MUX bus interface 100 includes a MUX bus controller 114 coupled to the XD data bus and the MUX bus 50, a MUX bus address encoder 110 coupled to the EISA bus 42 and the MUX bus controller 114, and a MUX bus I/O cycle tracker 112 coupled to the EISA bus 42, the MUX bus controller 114 and the MUX bus address encoder 110. The CSP 46 also includes the DMA controller 102, a central arbitration controller (CAC) 104 which is similar to the EISA arbitration controller in the ESP, and also miscellaneous logic referred to as the SGC 106.

The MUX bus interface 100 filters a plurality of system interrupt signals, referred to as IRQ3–IRQ12, IRQ14 and IRQ15, and then transmits corresponding MUX signals to the DSPs 48a and 48b across the MUX bus 50. To distinguish normal signals from those signals transferred on the MUX bus 50, the signals transferred on the MUX bus 50 are referred to as MUX signals. The SDB 44 asserts a signal CERR* low when a correctable memory error is detected. The DMA controller 102 supports buffer chaining which is the capability to alter the base registers of a DMA channel during the course of a DMA transfer. If one of the CPUs 20 and 22 is the programming master of a DMA channel of the DMA controller 102 and buffer chaining is in effect, and if the corresponding DMA device indicates terminal count to the DMA controller 102, the DMA controller 102 asserts an interrupt signal referred to as DMAIRQ when data transfer of the current buffer is completed. The MUX bus interface 100 receives the CERR* and the DMAIRQ interrupt signals and sends corresponding MUX signals CERR and DMAIRQ across the MUX bus 50. The DSPs 48a and 48b receive the CERR and DMAIRQ MUX signals and combine them to form an IRQ13 or numeric coprocessor interrupt signal. The MUX bus interface 100 also receives the KBINT* signal and provides a corresponding IRQ1 MUX signal on the MUX bus 50. Furthermore, an IRQ12 signal is combined using an AND gate (not shown) with the MSEINT* signal received from the keyboard controller 62 to form an IRQ12 MUX signal, which is sent across the MUX bus 50.

The CSP 46 preferably detects the assertion of five non-maskable interrupt conditions on the system board and transfers corresponding MUX signals to the DSPs 48a and 48b on the MUX bus 50. A signal IOCHK* indicates an expansion bus error when asserted low, which is generated by expansion bus memory boards with a parity error or by an expansion board with an error. The MUX bus interface 100 detects the assertion of the IOCHK* signal low and provides an IOCHK MUX signal high on the MUX bus 50 in response. A signal NCERR* is asserted low by the SDB 44 when a non-correctable parity or memory error is detected. The MUX bus interface 100 detects the assertion of the NCERR* signal low and provides an NCERRMUX signal to the DSPs 48a and 48b on the MUX bus 50.

Two other NMI interrupt signals are the expansion bus cycle timeout (BUSTIM) and the EISA bus master timeout (EBMTIM) which are generated in the CAC 104. A signal CMD, resides on the EISA bus 42 and a timer (not shown) determines the amount of time that the CMD* signal is asserted low. The BUSTIM timeout preferably occurs and a BUSTIM signal is asserted if the CMD* signal is asserted for more than 32 microseconds, which is approximately 256 periods of a clock signal BCLK residing on the EISA bus 42, or if the EBMTIM timeout occurs. If an EISA bus master retains the EISA bus 42 for more than 256 BCLKs after its acknowledge signal is negated, the EBMTIM timeout occurs and a signal EMBTIM is asserted. The MUX bus interface 100 receives signals BUSTIM or EBMTIM from the CAC 104 and provides corresponding BUSTIM and EBMTIM MUX signals across the MUX bus 50.

A refresh timer (not shown) within the timers 98 of the logical CPU0, which is the CPU 20 in the preferred embodiment, asserts a signal REFQUE* low upon each timeout of the refresh timer, which signal is received by the CAC 104. Each negative going edge on the REFQUE* signal increments an internal refresh queue counter (not shown) within the CAC 104 by one. This refresh counter keeps track and queues up all of the refresh requests until such time that a refresh controller (not shown) within the CSP 46 gains access to the EISA bus 42 and runs a refresh cycle. The CSP 46 may handle up to four pending refresh cycles so that if more than four cycles are pending, the refresh queue counter does not increment but indicates a refresh queue overflow signal REFQOVR which is provided to the MUX bus interface 100. The MUX bus interface 100 correspondingly asserts a REFQOVR MUX signal on the MUX bus 50, which is received by the DSPs 48a and 48b.

There are a few other miscellaneous transfers which are required to inform the DSPs 48a and 48b of the occurrence of several miscellaneous events within the CSP 46. Both the assertion and deassertion of these events is transferred on the MUX bus 50. Upon power up, the computer C automatically determines which CPUs are installed in available physical CPU slots and assigns logical port numbers. A power up timeout MUX signal, referred to as PUTO, is asserted if a CPU does not respond before timeout of a timer, indicating that CPU is not installed. For more information on this assignment capability, please see related copending application Ser. No. 07/955,683, which is now U.S. Pat. No. 5,437,042, filed concurrently with this application, which is hereby incorporated by reference. Two other miscellaneous signals are provided on the MUX bus 50. The CSP 46 incorporates most of the logic previously located in a logic block referred to as SGC which was separate from the ESP. The SGC 106 includes the CPU restart logic and force A20 logic and asserts corresponding RSTAR and LOWA20 signals. These signals are the same or similar in prior systems and will not be described further. Any changes in the state of these signals is transferred on the MUX bus 50 as MUX signals RSTAR and LOWA20 by the MUX bus interface 100.

The MUX bus 50 preferably includes eleven I/O lines coupled to the corresponding ADECs of the DSPs 48a and 48b and the MUX bus controller 114 of the CSP 46, where 8 lines define an 8-bit bi-directional address and data bus referred to as XAD, which includes signals XAD<7 . . . 0> for transferring the MUX signals described above as well as address and data signals. The remaining 3 lines define a 3-bit status bus referred to as XST, which comprises signals XST<2 . . . 0>. For each transfer cycle, the XST status bus indicates one of the eight cycle types, and the XAD bus is asserted with corresponding MUX, address or data signals, depending upon the type of cycle. The eight different cycle types are preferably defined as follows, where a small letter "b" indicates binary notation: an I1 interrupt cycle where the XST<2 . . . 0> signals equal 000b, for transferring the IRQ<1, 3 . . . 7>, CERR and DMAIRQ MUX signals; an I2 interrupt cycle where the XST<2 . . . 0> signals equal 001b, for transferring the IRQ<8 . . . 12, 14, 15> MUX signals; an I/O address cycle where the XST<2 . . . 0> signals equal 100b, for transferring an encoded MUX bus address ADD on the XAD bus, referred to as XA<7 . . . 0> during an I/O address cycle; an I/O data read cycle where the XST<2 . . . 0> signals equal 110b, for reading data asserted by one or all of the DSPs 48a and 48b on the XAD bus from the XD data bus; an I/O data write cycle where the XST<2 . . . 0> signals equal 101b, for writing data to one or all of the DSPs 48a and 48b; a DMA cycle where the XST<2 . . . 0> signals equal 010b, for transferring the TC<0 . . . 3, 5 . . . 7> MUX signals; an NMI cycle where the XST<2 . . . 0> signals equal 011b, for transferring the NMI MUX signals; and a miscellaneous cycle, referred to as MISC, where the XST<2 . . . 0> signals equal 111, for transferring the RSTAR, LOWA20 and PUTO MUX signals. These cycles are summarized in Table 1 below.

The MUX bus address encoder 110 also provides an 8-bit encoded MUX bus address, referred to as ADD, to the MUX bus controller 114 which is subsequently driven onto the XAD bus by the CSP 46. This encoded address is the internal or MUX bus address of the particular register referenced over the EISA bus 42 with a full 16-bit I/O address or 32-bit memory address. The MUX bus I/O cycle tracker 112 receives the MUXSEL signal, the HCLK and BCLK signals and a signal START* which resides on the EISA bus 42, and asserts a signal MUXDATA if the MUXSEL signal is asserted high on the rising edge of the HCLK signal corresponding to the next rising edge of the BCLK signal after the assertion of the START* signal. This condition indicates that an EISA MUX bus address has been asserted on the EISA bus 42.

As will be described below, an I/O data read or write cycle eventually follows the I/O address cycle. The MUX bus controller 114 receives a W-R signal from the EISA bus 42 which indicates whether the I/O data cycle is a read or a write cycle. These cycles are illustrated more fully in FIGS. 5A, 5B, 6A and 6B below. In this manner, one of the CPUs 20 and 22 or any EISA and ISA bus master may read data from and write data to the registers residing in the DSPs 48a and 48b by executing a read or write cycle on the EISA bus 42 and providing the appropriate EISA MUX bus address.

The ADECs within the DSPs 48a and 48b detect the cycle type from the XST status signals, and latch the data to or from the corresponding register for each of the cycles. Both of the DSPs 48a and 48b respond to I1, I2, address, DMA, NMI and MISC cycles. If the cycle is an I/O data read cycle and for several I/O data write cycles, however, only one of the DSPs 48a and 48b is selected and will respond. The selection criterion is described more fully below.

The MUX bus interface 100 controls the MUX bus 50, which is further clocked by an HCLK clock signal preferably residing on the host bus 24. All of the MUX cycles are one HCLK period in duration except for data cycles, which take 3 HCLK periods to complete. I1 interrupt cycles are repeatedly executed during each HCLK period unless inter-

TABLE 1

MUX BUS 50 BIT DEFINITION

| MUX BUS XST<2:0> | I1 000 | I2 001 | ADDRESS 100 | DATA Rd-110 Wr-101 | DMA 010 | NMI 011 | MISC 111 |
|---|---|---|---|---|---|---|---|
| XAD<7> | CERR | rsvd | XA<7> | XD<7> | TC<7> | rsvd | rsvd |
| XAD<6> | DMAIRQ | IRQ<15> | XA<6> | XD<6> | TC<6> | rsvd | rsvd |
| XAD<5> | IRQ<7> | IRQ<14> | XA<5> | TC<5> | rsvd | rsvd | rsvd |
| XAD<4> | IRQ<6> | IRQ<12> | XA<4> | XD<4> | rsvd | REFQOVR | rsvd |
| XAD<3> | IRQ<5> | IRQ<11> | XA<3> | XD<3> | TC<3> | EBMTIM | rsvd |
| XAD<2> | IRQ<4> | IRQ<10> | XA<2> | XD<2> | TC<2> | BUSTIM | RSTAR |
| XAD<1> | IRQ<3> | IRQ<9> | XA<1> | XD<1> | TC<1> | IOCHK | LOWA20 |
| XAD<0> | IRQ<1> | IRQ<8> | XA<0> | XD<0> | TC<0> | NCERR | PUTO |

The term "rsvd" in Table 1 indicates a reserved signal for future use which is not currently being used in the preferred embodiment.

There are a plurality of system addresses preferably defined to correspond to registers and ports within the CSP 46 and the DSPs 48a and 48b. These system addresses are referred to as EISA MUX bus addresses and are mapped into a plurality of 8-bit encoded MUX bus addresses corresponding to the registers and ports within the DSPs 48a and 48b. The MUX bus address encoder 110 receives the signals on the LA address lines residing on the EISA bus 42 and asserts a signal MUXSEL when an address appearing on the EISA bus 42 corresponds to one of the EISA MUX bus addresses.

rupted by a request to execute another type of cycle. This allows the lowest latency time for those particular signals provided during an I1 interrupt cycle. Historically, these are the interrupts most sensitive to latency in an IBM compatible personal computer. By effectively continuously broadcasting their state, the PIC 94 in the DSP 48a senses any changes in the minimum time. Several request signals are provided to facilitate interrupting I1 cycles. A signal XI2_REQ is asserted if any one of the IRQ<8 . . . 12, 14, 15> signals are asserted; a signal XDMA_REQ is asserted if any of the terminal count bits TC<0 . . . 3, 5 . . . 7> are asserted; a signal XNMI_REQ is asserted if any of the REFQOVR, EBMTIM, BUSTIM, IOCHK* and NCERR* signals are asserted; and a signal XMISC_REQ is asserted when any of the RSTAR, LOWA20 and the PUTO signals change state. The XI2_REQ, XNMI_REQ, XDMA_REQ and XMISC_REQ request signals are provided to a request logic block 116 which provides a signal XREQ to the MUX bus controller 114. The XREQ signal is defined as being asserted high when any of the signals XI2_REQ, XNMI_REQ, XDMA_REQ or XMISC_REQ signals are asserted indicating a request to run an I2, NMI, DMA or MISC cycle on the MUX bus 50, respectively. The I1, I2, DMA, NMI and MISC cycles are executed to update the DSPs 48a and 48b with the corresponding MUX signals.

Figure 3:
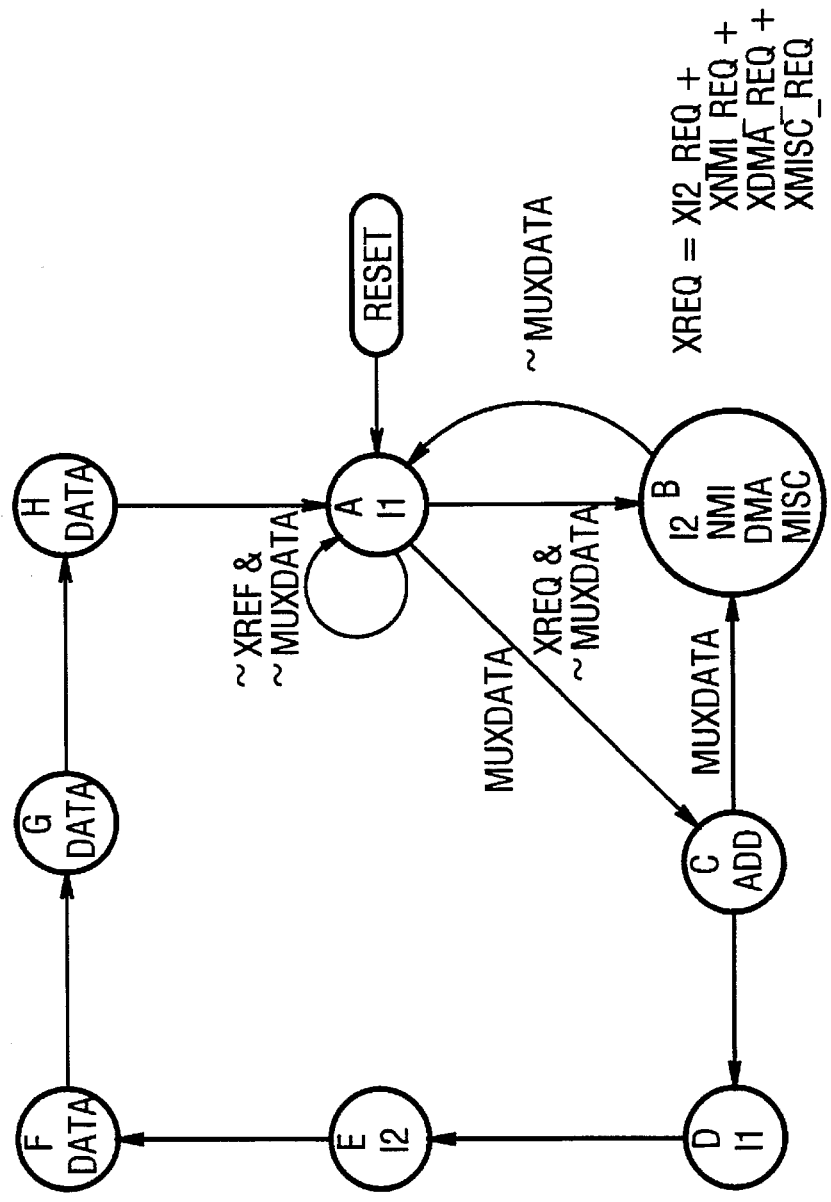
FIG. 3 is a state diagram of a state machine located in the CSP of FIG. 1 used to control the multiplexed bus of FIG. 1.

Referring now to FIG. 3, a MUX bus controller state diagram is shown which is operated by a state machine within the MUX bus controller 114 and which is advanced by the HCLK signal. Upon reset of the computer system C, the state machine enters a state A where the MUX bus controller 114 executes one I1 interrupt cycle on the MUX bus 50 for each HCLK period while in state A. The ADEC 88 of the DSP 48a and a corresponding ADEC of the DSP 48b receive the I1 signals during each I1 interrupt cycle and latch the data into the appropriate local interrupt registers as determined by the XST status signals. In the state diagram of FIG. 3, a "" tilde signal in front of a signal name indicates logical negation where the signal is not asserted. As long as the XREQ and MUXDATA signals are negated low in state A, the state machine remains in state A and the MUX bus controller 114 executes consecutive I1 interrupt cycles for each HCLK period.

If the MUXDATA signal remains negated and the XREQ signal is asserted, the state machine transfers to a state B indicating a request for an I2, NMI, DMA or MISC cycle. The particular cycle executed in state B is determined by the respective request signal, and the XST<2 ... 0> signals are asserted by the MUX bus controller 114 to correspond to the appropriate cycle. During the I2, NMI, DMA and MISC cycles, both DSPs 48a and 48b monitor the XST status signals, enable the appropriate registers and latch in the data from the XAD bus into those registers. Upon the next rising edge of the HCLK signal, the state machine returns to state A if the MUXDATA signal remains negated.

If the MUXDATA signal is asserted in state A or in state B, the state machine transfers to a state C and the MUX bus controller 114 performs an I/O address cycle on the MUX bus 50 on the next rising edge of the HCLK signal. The address asserted on the XAD bus is the MUX bus encoded address ADD which is encoded by the MUX bus address encoder 110. The state machine then transfers to a state D so that an I1 interrupt cycle is again executed on the next rising edge of the HCLK signal and then advances to a state E where an I2 interrupt cycle is executed on the next rising edge of the HCLK signal. In this manner, after the transfer of the address ADD in state C, the two interrupt cycles I1 and I2 are executed to ensure that any assertions of the CERR* and DMAIRQ signals and the IRQ<1, 3 ... 12, 14, 15> signals are provided to the DSPs 48a and 48b before significant delay. This prevents significant latency between the time a system interrupt is detected by the CSP 46 and the time this occurrence is communicated to the DSPs 48a and 48b.

From state E, operation transfers to a state F which begins a three HCLK period I/O data transfer cycle, where the state machine advances from state F to a state G and then to a state H on subsequent rising edges of the HCLK signal. The MUX bus controller 114 determines whether the I/O data cycle is a read or a write cycle from the W-R signal, and executes the appropriate cycle and asserts the XST status signals accordingly. The XST status signals indicate to the DSPs 48a and 48b whether the I/O data cycle is a read or a write cycle. The data transfer is three cycles in length to allow the bi-directional XAD data bus to switch direction on an I/O data read cycle. Recall that an I/O address cycle was previously executed on the MUX bus 50, where the address ADD was latched into the selected one of the DSPs 48a and 48b to identify the appropriate registers to enable. Thus, during an I/O data read cycle, the selected one of the DSPs 48a and 48b must write data to the MUX bus 50. During an I/O data write cycle, the data on the XD data bus is driven on to the XAD bus and into the appropriate registers of one or both of the DSPs 48a and 48b. During an I/O data read cycle, the data is asserted on the XAD bus by the selected DSP and is latched to the XD data bus. From state H, operation transfers back to state A to again perform an I1 interrupt cycle during the following HCLK period.

Figure 4A:
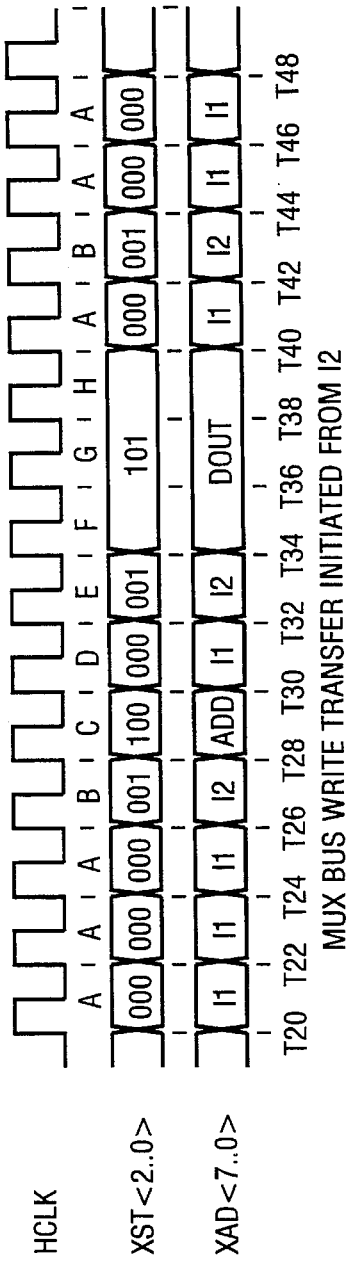
FIGS. 4A, 4B and 4C are MUX bus timing diagrams illustrating cycle sequences on the multiplexed bus of FIG. 1.
Figure 4B:
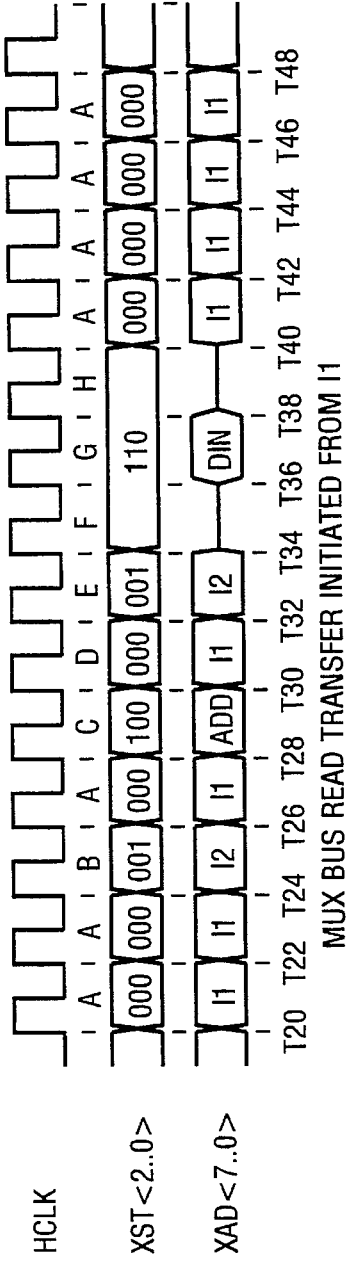
Figure 4C:
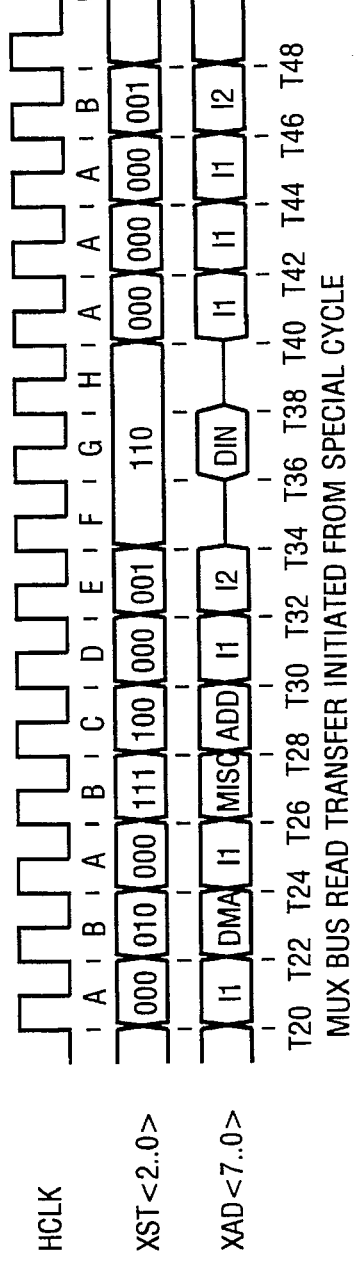

Referring now to FIGS. 4A–4C, three MUX bus timing diagrams are shown illustrating the respective cycles on the MUX bus 50. A MUX bus I/O data write transfer cycle initiated from an I2 interrupt cycle is shown in FIG. 4A, a MUX bus I/O data read transfer cycle initiated from an I1 interrupt cycle is shown in FIG. 4B, and a MUX bus I/O data read transfer cycle initiated from a MISC cycle is shown in FIG. 4C. The HCLK signal is shown at the top of the timing diagrams to clearly illustrate changes from one cycle to the next on the rising edge of the HCLK signal. In each of the timing diagrams, the state of the XST<2 ... 0> signals are shown to identify the cycle type, and the XAD bus is shown including the name of the cycle type to identify the MUX, data or address signals being transferred. The corresponding states of the MUX bus controller 114 state machine are shown for each cycle above the XST<2 ... 0> signals.

Referring now to FIG. 4A, the state machine of the MUX bus controller 114 enters state A at a time T20, where the XST<2 ... 0> signals equal 000b and the XAD bus communicates the I1 interrupt signals shown in Table 1. Each subsequent time designator is incremented by 2 indicating that one HCLK period has elapsed, unless otherwise stated. Thus, at a time T22, one HCLK period later at the next rising edge of the HCLK signal, the XREQ and MUXDATA signals remain negated so that the state machine remains in state A and the MUX bus controller 114 performs another I1 interrupt cycle during the next HCLK period. Again at a time T24, the state machine remains in state A and another I1 interrupt cycle is executed. During this HCLK period after the time T24, the XI2_REQ and XREQ signals are asserted indicating a request for an I2 interrupt cycle. Thus, at a subsequent time T26, the state machine enters state B and the XST<2 ... 0> signals equal 001b indicating that an I2 interrupt cycle is occurring. Between the times T26 and a time T28, the MUXDATA signal is asserted indicating an EISA I/O cycle is requested to one or both of the DSPs 48a and 48b. Thus, at the time T28 which is the next rising edge of the HCLK signal, the state machine enters state C and the encoded MUX bus address ADD is asserted on the XAD bus by the MUX bus controller 114.

On the next rising edge of the HCLK signal at a time T30, the state machine enters state D and an I1 interrupt cycle is executed by the MUX bus controller 114. Then, at the next rising edge of the HCLK signal at a time T32, the state machine enters state E and an I2 interrupt cycle is performed on the MUX bus 50. Note that the I1 and I2 interrupt cycles are always executed after an I/O address cycle to ensure that none of the interrupts are delayed to prevent significant interrupt latency. Subsequently, on the next rising edge of the HCLK signal at a time T34, the MUX bus controller 114 performs an I/O data write cycle and the state machine steps through the states F, G and H where the XST<2 . . . 0> signals remain equal to 101b indicating an I/O data write cycle. Thus, the CSP 46 asserts the data latched from the XD data bus onto the XAD bus and a selected one or both of the DSPs 48a and 48b receive the data from the XAD bus. The write cycle takes 3 HCLK periods to match the number of HCLK periods required for read cycles. At a time T40, 3 HCLK periods later, the state machine reenters state A and the MUX bus controller 114 performs an I1 interrupt cycle on the MUX bus 50. During the time between T40 and a time T42, the XI2_REQ and the XREQ signal are asserted so that at the time T42, the state machine enters state B and an I2 interrupt cycle is executed on the MUX bus 50. Since the MUXDATA signal remains negated, operation proceeds on the next rising edge of the HCLK signal at a time T44 back to state A where an I1 interrupt cycle is performed.

Referring now to FIG. 4B, a MUX bus I/O data read cycle initiated from an I1 interrupt cycle is illustrated. Again, the state machine of the MUX bus controller 114 remains in state A until the time T24. The XI2_REQ signal is asserted before the time T24 and the state machine enters state B after the time T24 and an I2 interrupt cycle is executed on the MUX bus 50. Since the MUXDATA signal is not asserted between the times T24 and T26, operation proceeds back to state A where an I1 interrupt cycle is executed. Between the times T26 and T28, the MUXDATA signal is asserted in response to a request for an I/O data read cycle, so that at the time T28, the state machine enters state C and an encoded address ADD is asserted by the MUX bus controller 114 on the XAD<7 . . . 0> signals. In this case, only the selected DSP latches the address and enables the appropriate register since only one of the DSPs 48a and 48b can respond during an I/O data read cycle. Operation then proceeds to state D where an I1 interrupt cycle is performed and then to state E at the time T32, where an I2 interrupt cycle is performed as described previously. From the time T34 until the time T40, the state machine steps through the states F, G and H on subsequent rising edges of the HCLK signal where the XST status bus indicates an I/O data read. Here, however, the data is provided by the selected DSP on the XAD<7 . . . 0> signals between the times T36 and T38, which corresponds to state G, and the data is latched by the MUX bus controller 114. At the time T40, the state machine reenters state A and remains in state A for the next four HCLK periods, so that four subsequent I1 interrupt cycles are performed.

Referring now to FIG. 4C, the state machine remains in state A between the times T20 and T22. During this time, however, the XDMA_REQ and XREQ signals are asserted so that at the time T22, the state machine enters state B and a DMA cycle is executed. During state B, the XST<2 . . . 0> signals equal 010b indicating the DMA cycle and the TC<0 . . . 3, 5 . . . 7> MUX signals are asserted on the XAD<7 . . . 0> signals. Operation then proceeds back to state A at the time T24 and an I1 interrupt cycle is performed. Between the times T24 and T26, the XMISC_REQ and XREQ signals are asserted indicating that one of the RSTAR, LOWA20 or PUTO signals have changed. Thus, a MISC cycle is executed on the MUX bus 50 beginning at the time T26, where the state machine enters state B and the XST<2 . . . 0> signals equal 111b. During state B, the MUXDATA signal is asserted so that at the time T28, the state machine enters state C and the MUX bus controller 114 asserts an encoded address ADD on the XAD<7 . . . 0> signals. Operation then steps through states D and E as indicated. At the time T34, the state machine enters state F and an I/O data read cycle is executed as indicated by the XST status bus.

Again, data is asserted by one of the DSPs 48a or 48b onto the XAD<7 . . . 0> signals during state G. As usual, at the time T40 operation proceeds back to state A and the I1 interrupt cycle is again performed.

The timing diagrams shown in FIGS. 5A, 5B, 6A and 6B illustrate the timing between the EISA bus 42 and the MUX bus 50, and is not intended to illustrate the entire EISA cycle if more than one 8-bit cycle occurs. The CSP 46 is preferably an 8-bit device, and thus only reads or writes one byte at a time. The EBC 40 detects that the CSP 46 is an 8-bit device, monitors the number of data bytes to be transferred and determines whether to run an 8, 16 or 32-bit cycle. FIGS. 5A, 5B, 6A and 6B illustrate only one 8-bit transfer during an EISA cycle, whereas several 8-bit cycles may actually be performed during the complete EISA cycle.

Figure 5A:
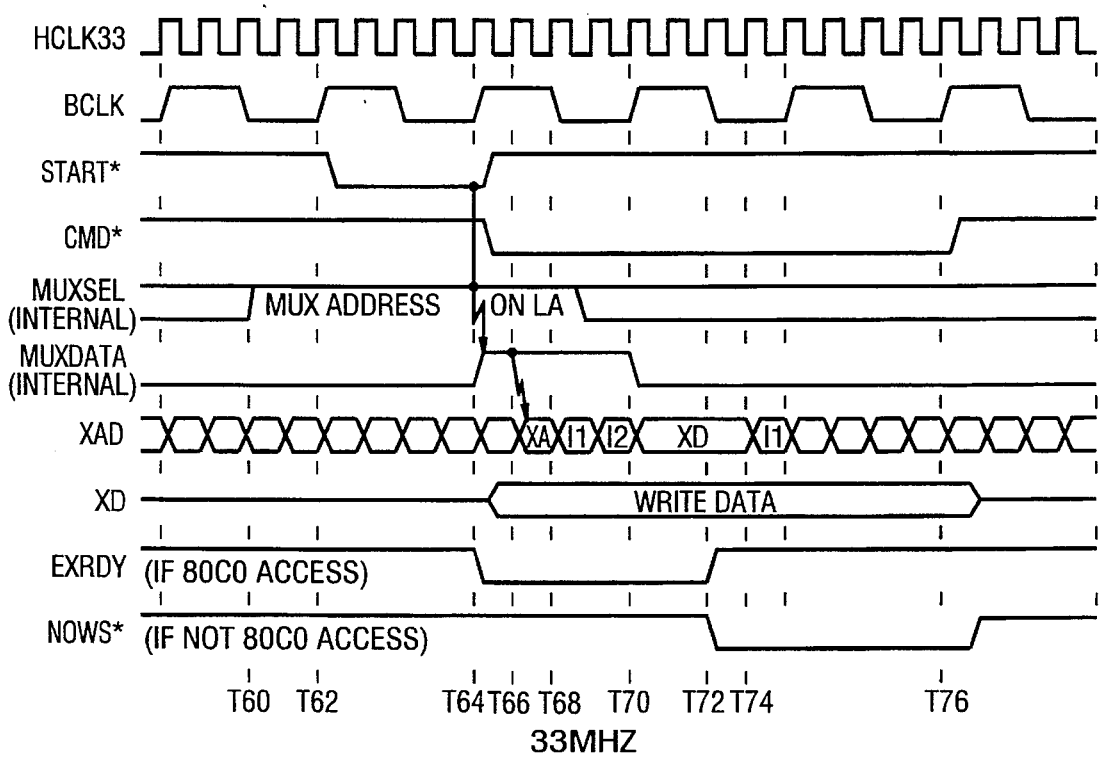
FIGS. 5A and 5B are timing diagrams illustrating write cycles between the multiplexed bus and the EISA bus of FIG. 1.

Referring now to FIG. 5A, a timing diagram is shown illustrating an EISA MUX bus I/O data write cycle initiated on the EISA bus 42 and executed on the MUX bus 50 by the CSP 46. A signal HCLK33 is a 33 MHz version of the HCLK signal, which is the frequency of the HCLK signal in a 66 MHz computer system C. The corresponding BCLK signal is also shown in FIG. 5A, which preferably operates at approximately one-fourth the frequency of the HCLK signal in a 33 MHz system. A signal referred to as NOWS* is preferably asserted low by the MUX bus controller 114 during a MUX bus I/O data read or write cycle to optimize the length of the ISA cycle used to access the CSP 46. An "h" at the end of an address indicates hexadecimal notation. The resulting cycle is approximately 4 BCLK periods in length, where 3 BCLK periods are required for the CMD* signal in order to satisfy the required read data setup time to the data portion of the EISA bus 42. When access is made to memory address locations 80C0000h or 80C0002h in the preferred embodiment, a signal referred to as EXRDY is negated low by the MUX bus controller 114 to request an extension of the EISA memory cycle. The resulting cycle is 4 BCLK periods in length where 3 BCLK periods are required for the CMD* signal.

At a time T60, the MUX bus address encoder 110 detects an EISA MUX bus address asserted on the LA signals of the EISA bus 42 indicating that an EISA cycle to the MUX bus 50 is in progress. The MUX bus address encoder 110 asserts the MUXSEL signal in response. Subsequently, at a time T62, the START* signal is asserted low according to EISA protocol initiating start of the EISA bus cycle. Approximately 1 BCLK period later, at a time T64 corresponding to approximately 4 HCLK periods in a 33 MHz system, the START* signal is detected low and the MUXSEL signal is detected high by the MUX bus I/O cycle tracker 112, which correspondingly asserts the MUXDATA signal in response. Also, the EXRDY signal is negated low to request an extension in case of an EISA memory write cycle. The CMD* signal is asserted low after the time T64 and the data to be written is asserted on the XD data bus. As described previously, the MUX bus controller 114 detects the assertion of the MUXDATA signal and executes an I/O address cycle on the MUX bus 50 beginning at time T66, which is 1 HCLK period after the time T64. During this time, the CSP 46 asserts the encoded address ADD from the MUX bus address encoder 110 on the XAD bus. The I/O address cycle completes at a time T68 which is 1 HCLK period after the time T66.

Figure 5B:
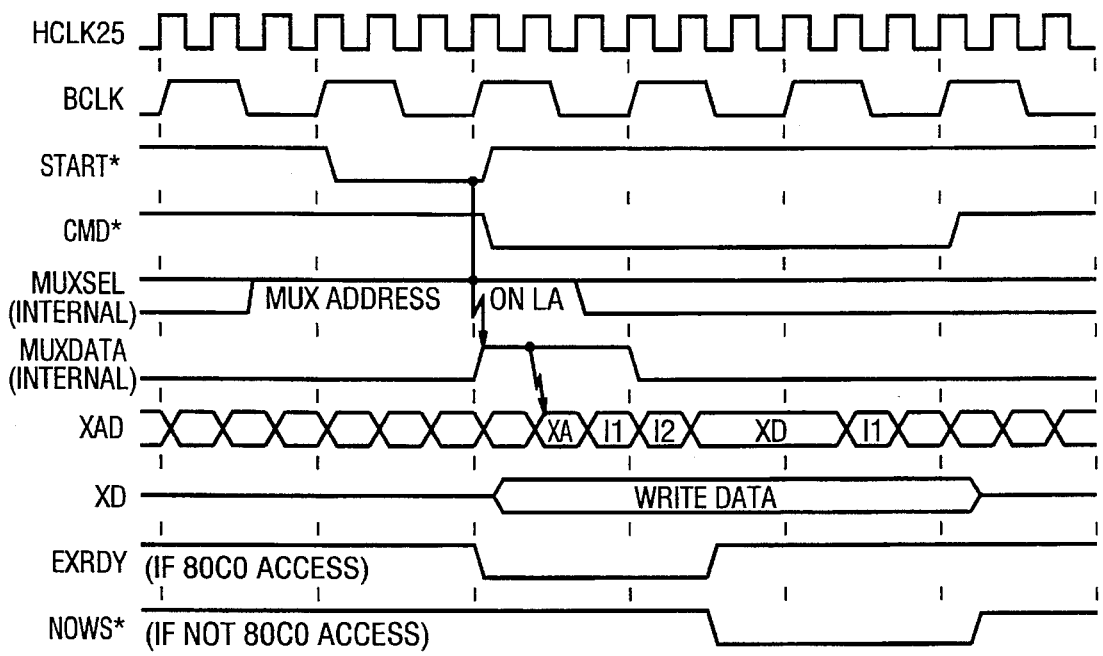

The MUX bus controller 114 then performs the I1 and I2 interrupt cycles on the MUX bus 50 as described previously. Then, at a time T70, an I/O data write cycle is initiated on the MUX bus 50 where the CSP 46 drives the data from the XD data bus on to the XAD bus on the MUX bus 50, which is received by the DSPs 48a and 48b. The EXRDY signal is reasserted if necessary or the NOWS* signal is asserted at a time T72 according to normal EISA protocol. The I/O data write cycle on the MUX bus 50 completes at a time T74 which is 3 HCLK periods after the time T70. The present 8-bit EISA cycle completes approximately at a time T76, which is 4 BCLK periods after the time T62 when the EISA cycle was initiated. FIG. 5B is similar to FIG. 5A but illustrates the timing in a computer system running at 50 MHz and thus having a 25 MHz HCLK signal. Note the BCLK signal is approximately one-third the frequency of the 25 MHz HCLK signal in FIG. 5B, so that the BCLK signal is preferably approximately the same frequency in both 25 and 33 MHz systems.

Figure 6A:
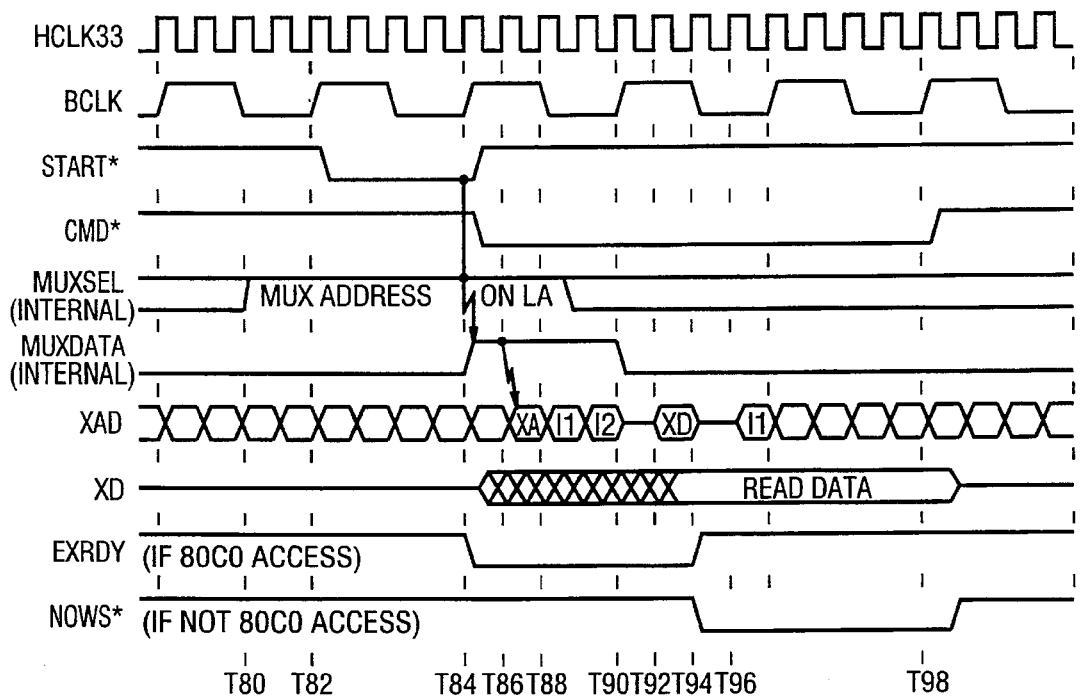
FIGS. 6A and 6B are timing diagrams illustrating read cycles between the multiplexed bus and the EISA bus of FIG. 1.

Referring now to FIG. 6A, a timing diagram is shown illustrating an EISA MUX bus I/O data read cycle initiated on the EISA bus 42 and executed on the MUX bus 50 by the CSP 46. At a time T80, the MUX bus address encoder 110 detects an EISA MUX bus address asserted on the LA signals of the EISA bus 42 indicating that an EISA cycle to the MUX bus 50 is in progress. Again, the MUX bus address encoder 110 asserts the MUXSEL signal in response. Subsequently, at a time T82, the START* signal is asserted low as before. Approximately 1 BCLK period later at a time T84, the START* signal is detected low and the MUXSEL signal is detected high by the MUX I/O cycle tracker 112, which correspondingly asserts the MUXDATA signal in response. Also, the EXRDY signal is negated low to request an extension in the case of an EISA memory write cycle. The CMD* signal is asserted low after the time T84. The MUX bus controller 114 detects the assertion of the MUXDATA signal and executes an I/O address cycle on the MUX bus 50 beginning at time T86, which is 1 HCLK period after the time T84. During this time, the CSP 46 asserts the encoded address ADD from the MUX bus address encoder 110 on the XAD bus. The I/O address cycle completes at a time T88, which is 1 HCLK period after the time T86.

Figure 6B:
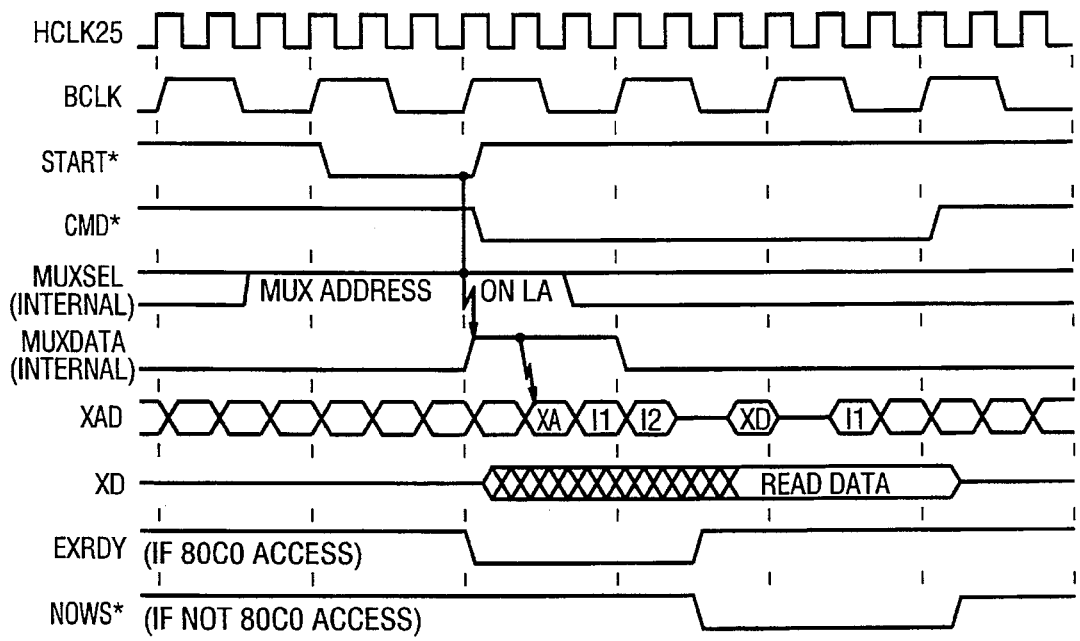

The MUX bus controller 114 then performs the I1 and I2 interrupt cycles on the MUX bus 50. Then, at a time T90, an I/O data read cycle is initiated on the MUX bus 50. The MUX bus controller 114 latches the data from the XAD bus from the DSP 48a between times T92 and T94, and drives the data on to the XD data bus at the time T94. The EXRDY signal is reasserted if necessary and the NOWS* signal is asserted at the time T94 according to normal EISA protocol for I/O cycles. The I/O data read cycle on the MUX bus 50 completes at a time T96, which is 3 HCLK periods after the time T90. The present 8-bit EISA cycle completes approximately at a time T98, which is 4 BCLK periods after the time T82 when the EISA cycle was initiated. FIG. 6B is similar to FIG. 6A but illustrates the timing in a computer system having a 25 MHz HCLK signal.

The I1, I2, DMA, NMI and MISC cycles are executed to broadcast the MUX signals described above to both DSPs 48a and 48b so that both DSPs 48a and 48b receive the MUX signals from the XAD data bus during the respective cycles. I/O address and data cycles can be to both DSPs 48a and 48b, but also may be intended for only one of the DSPs 48a and 48b. In the preferred embodiment, several index ports are defined at consecutive system addresses to provide I/O cycles to a selected DSP. An index CPU port is preferably located within each DSP 48a and 48b, where the data written to these ports identifies one of the CPUs 20 and 22 and its corresponding DSP 48a and 48b. An index address low register and an index address high register, collectively referred to as the index address registers, are located in the CSP 46 where a system address written to these registers identifies one of the local registers within the selected DSP 48a or 48b to be accessed. Finally, an index data register is provided within the CSP 46 to contain the data to be read or written.

To execute an index write, the access is preferably accomplished in one doubleword access to the EISA bus 42 providing a system address on the EISA bus 42 to the index registers. The index registers preferably reside at consecutive system address locations where the index CPU port is first, followed by the index address registers, which are then followed by the index data register. In the 32-bit data operation, a first byte corresponds to the index CPU port to identify the selected CPU, the next two bytes correspond to the index address registers containing a 16-bit system address identifying the appropriate register to be written to, and the last byte corresponds to the index data register and contains the data to be written. The EBC 40 executes one EISA cycle comprising four 8-bit subcycles to the CSP 46. The CSP 46 latches the first byte into the index CPU port and executes an I/O address and data write cycle on the MUX bus 50 to transfer the first byte to the index CPU ports of the DSPs 48a and 48b to select one of the CPUs 20 and 22. Both DSPs 48a and 48b respond by latching the data. The CSP 46 then receives the next two bytes from the XD data bus during the next two 8-bit subcycles on the EISA bus 42 and latches these bytes to the index address registers. The CSP 46 then receives the last byte from the XD data bus and latches it into the index data register, decodes the address in the index address register and executes a second I/O address and data cycle, which is a write cycle to the register within the selected DSP. The index data register contains the data to be written to the appropriate register. Only the DSP of the selected CPU responds during the second set of I/O address and data cycles on the MUX bus 50.

Indexed read cycles are executed in a similar manner except that the index CPU port and index address registers must first be written during a first 3-byte EISA cycle, where the CSP 46 executes an I/O address and data cycle to select the DSP. Then, a subsequent EISA cycle is executed to read the index data register in the CSP 46, which performs an I/O address and data cycle over the MUX bus 50 to obtain the data from the selected DSP. The CSP 46 in turn provides the appropriate data on the EISA bus 42. Semaphore or some other means of protecting the index registers may be necessary in some instances.

It is clear from the timing diagrams and from Table 1 that a significant number of signals are broadcast to the DSPs 48a and 48b from the CSP 46 with a small number of bus lines using the multiplexed communication protocol of the present invention. In fact, eleven lines are used to communicate 30 signals in the preferred embodiment, although up to 40 signals could be transferred on five 8-bit cycles allowing for I/O address, data read and data write cycles. The multiplexed I/O address and data cycles allow other system devices and the CPUs 20 and 22 to have access and control over the registers within the DSPs 48a and 48b. The sequence of cycles executed on the MUX bus 50 by the MUX bus controller 114 prevents significant bus latency between the time a system interrupt occurs and when it is received by the DSPs 48a and 48b.

The multiplexed bus according to the present invention allows a significant reduction in the number of I/O pins that would otherwise be required between the CPUs 20 and 22 and the CSP 46. Consequently, the connector size used for the CPUs 20 and 22 and the CSP 46 is significantly smaller resulting in substantial space and cost savings. Furthermore, reducing the number of I/O pins allows smaller die sizes on the chips used to implement the CPUs 20 and 22 and the CSP 46, further reducing size and cost of the computer system C.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A multiplexed communication apparatus for monitoring and communicating occurrences of a plurality of events, comprising:

a bus comprising a plurality of data lines and a plurality of encoded cycle type identifier lines;

means for monitoring the plurality of events, wherein if one of the events occurs, said monitoring means asserts a corresponding signal in one of a plurality of sets of data signals, said sets of data signals corresponding to groupings of the plurality of events, and also asserts a request signal of a plurality of request signals, said plurality of request signals corresponding to said plurality of sets of data signals and said asserted request signal corresponding to said one of a plurality of sets of data signals; and means coupled to said bus for continuously executing cycles on said bus, wherein each cycle corresponds to one of a plurality of cycle types, wherein said cycle executing means asserts a corresponding one of said plurality of sets of data signals on said data lines and on said cycle type identifier lines identifying the particular cycle type being performed for each cycle type, and wherein said cycle executing means continuously executes a first cycle type until receiving one of said plurality of request signals from said monitoring means, wherein when one of said request signals is received, said cycle executing means executes one cycle of a cycle type corresponding to said one of said plurality of sets of data signals corresponding to said received request signal, and then resumes executing said first cycle type.

2. The multiplexed communication apparatus of claim 1, wherein said set of data signals corresponding to said first cycle type includes a first set of system interrupt signals and wherein said plurality of sets of data signals includes a second set of system interrupt signals.

3. The multiplexed communication apparatus of claim 1, wherein said plurality of sets of data signals includes a set of nonmaskable interrupt signals and a set of direct memory access terminal count bits.

4. The multiplexed communication apparatus of claim 1, further comprising:

means for providing a clock signal; and wherein said cycle executing means receives said clock signal and completes cycles corresponding to said first cycle type and cycles corresponding to said plurality of request signals in one period of said clock signal.

5. The multiplexed communication apparatus of claim 1, further comprising:

at least one slave device coupled to said bus, each said slave device comprising:

means for monitoring said cycle type identifier lines and for determining which of said plurality of cycle types is being executed; and means coupled to said monitoring means for receiving and storing a set of data signals asserted on said data lines.

6. The multiplexed communication apparatus of claim 5, wherein said receiving and storing means includes a plurality of registers;

wherein said monitoring means enables one of said plurality of registers based on the type of cycle indicated by said cycle type identifier signals; and wherein said receiving and storing means latches a set of data signals asserted on said data lines into said enabled register.

7. The multiplexed communication apparatus of claim 1, further comprising:

said plurality of cycle types further including an address cycle and data cycles, wherein said data cycles further include a data read cycle and a data write cycle;

means coupled to said cycle executing means for providing a data request signal to said cycle executing means;

means providing a read/write signal to said cycle executing means indicating a read or a write cycle; and wherein if said cycle executing means receives said data request signal, said cycle executing means executes an address cycle and asserts an address on said data lines, and if said read/write signal indicates a read cycle, said cycle executing means executes a data read cycle after said address cycle and reads data from said data lines during said data read cycle, and wherein if said read/write signal indicates a write cycle, said cycle executing means executes a data write cycle after said address cycle and asserts data onto said data lines, and then said cycle executing means resumes executing said first cycle type.

8. The multiplexed communication apparatus of claim 7, wherein said set of data signals of said first cycle type includes a first set of system interrupt signals and wherein said plurality of sets of data signals includes a second set of system interrupt signals provided as data signals of a second cycle type; and wherein said cycle executing means inserts a cycle of said first cycle type and a cycle of said second cycle type between said address cycle and either of said data cycles.

9. The multiplexed communication apparatus of claim 8, further comprising:

a clock signal;

wherein said cycle executing means receives said clock signal and completes each one of said plurality of cycle types in one clock period except said data cycles, wherein said cycle executing means completes either one of said data cycles in three clock periods.

10. The multiplexed communication apparatus of claim 7, further comprising:

at least one slave device coupled to said bus and responding to cycles executed on said bus, each said slave device comprising:

means for monitoring said cycle type identifier lines and for determining and indicating which of said plurality of cycle types is being executed;

a plurality of registers; and means coupled to said monitoring means, said data lines and said plurality of registers for receiving an address identifying one of said registers from said data lines and enabling said identified register, and for receiving data from said data lines and providing the data to said identified register if said monitoring means indicates a data write cycle, and for providing data from said identified register to said data lines if said monitoring means indicates a data read cycle.

11. The multiplexed communication apparatus of claim 10, wherein one of said plurality of registers within each said slave device is an index select register for holding data indicative of whether that slave device is selected; and wherein each said slave device responds to address and data write cycles identifying said index register, and wherein each said slave device only responds to said address and data cycles identifying registers other than said index register if said data in said index select register indicates said slave device is selected.

12. A computer system, comprising:

a host bus;

a multiplexed bus comprising a plurality of data lines and a plurality of cycle type identifier lines;

means for providing a plurality of sets of signals indicating conditions of the computer system, said plurality of sets of signals including a first set of interrupt signals;

a central system peripheral coupled to said multiplexed bus and said signal providing means, said central system peripheral comprising:

means for monitoring said plurality of sets of signals and for providing a plurality of request signals, wherein each one of said plurality of request signals corresponds to one set of said plurality of sets of signals and wherein if any signal in a set of signals is asserted, said monitoring means provides a corresponding one of said plurality of request signals;

a multiplexed bus controller coupled to said signal providing means and said monitoring means for executing cycles on said multiplexed bus and for asserting cycle type identifier signals on said plurality of cycle type identifier lines indicating the type of cycle being executed, wherein said multiplexed bus controller continuously executes cycles for broadcasting a first group of interrupt signals indicative of said first set of interrupt signals until receiving one of said request signals, wherein said multiplexed bus controller executes one cycle and broadcasts a corresponding group of signals indicative of a set of said plurality of sets of signals which corresponds to said received request signal; and at least one CPU coupled to said host bus, each said CPU comprising:

a processor;

a cache system coupled to said processor;

a distributed system peripheral coupled to said cache system and said multiplexed bus, said distributed system peripheral comprising:

control lines;

local logic coupled to said control lines including a plurality of registers; and a multiplexed interface coupled to said cache system, said control lines and said multiplexed bus, said multiplexed interface further comprising:

means for monitoring said cycle type identifier signals and for determining the type of cycle being executed;

means coupled to said cycle type monitoring means and said plurality of registers for enabling one of said registers based on the type of cycle being executed; and means for retrieving a set of data signals from said data lines and for providing said set of data signals to said enabled register.

13. The computer system of claim 12, wherein said plurality of sets of data signals and said plurality of request signals includes a set of terminal count signals and a corresponding DMA request signal, a second set of interrupt signals and a corresponding interrupt request signal and a set of nonmaskable interrupt signals and a corresponding nonmaskable interrupt request signal.

14. A method of multiplexing a plurality of cycles on a bus in a computer system, wherein the bus comprises a plurality of data lines and cycle type identifier lines, said method comprising the steps of:

continuously executing a first type of cycle on the bus by asserting a first set of data corresponding to the first cycle type on the data lines and asserting cycle type identifier signals indicative of the first cycle type on the cycle type identifier lines;

asserting a request signal in response to the assertion of one signal of a second set of data;

executing one cycle of a second type of cycle in response to the request signal by asserting the second set of data on the data lines and asserting cycle type identifier signals indicative of the second cycle type on the cycle type identifier lines, and wherein said continuous execution of said first type of cycle is interrupted; and resuming said step of continuously executing a first type of cycle.

15. The method of claim 14 further comprising the steps of:

asserting a request signal to execute a data cycle;

executing an address cycle in response to receiving the data request signal by asserting an address on the plurality of data lines and asserting cycle type identifier signals indicating an address cycle on the cycle type identifier lines, with said continuous execution of said type of cycle being interrupted; and executing a data cycle following the address cycle by asserting data on the plurality of data lines and also asserting cycle type identifier signals indicating a data cycle on the cycle type identifier lines, with said continuous execution of said type of cycle being interrupted.

16. The method of claim 15, further comprising the step of:

executing a single first type of cycle and then executing a single second type of cycle after said step of executing an address cycle and before said step of executing a data cycle.

\* \* \* \* \*